Oct. 29, 1968 D. D. LIEDEL 3,407,683
UNIVERSAL MIRROR
Filed June 10, 1966 2 Sheets-Sheet 2
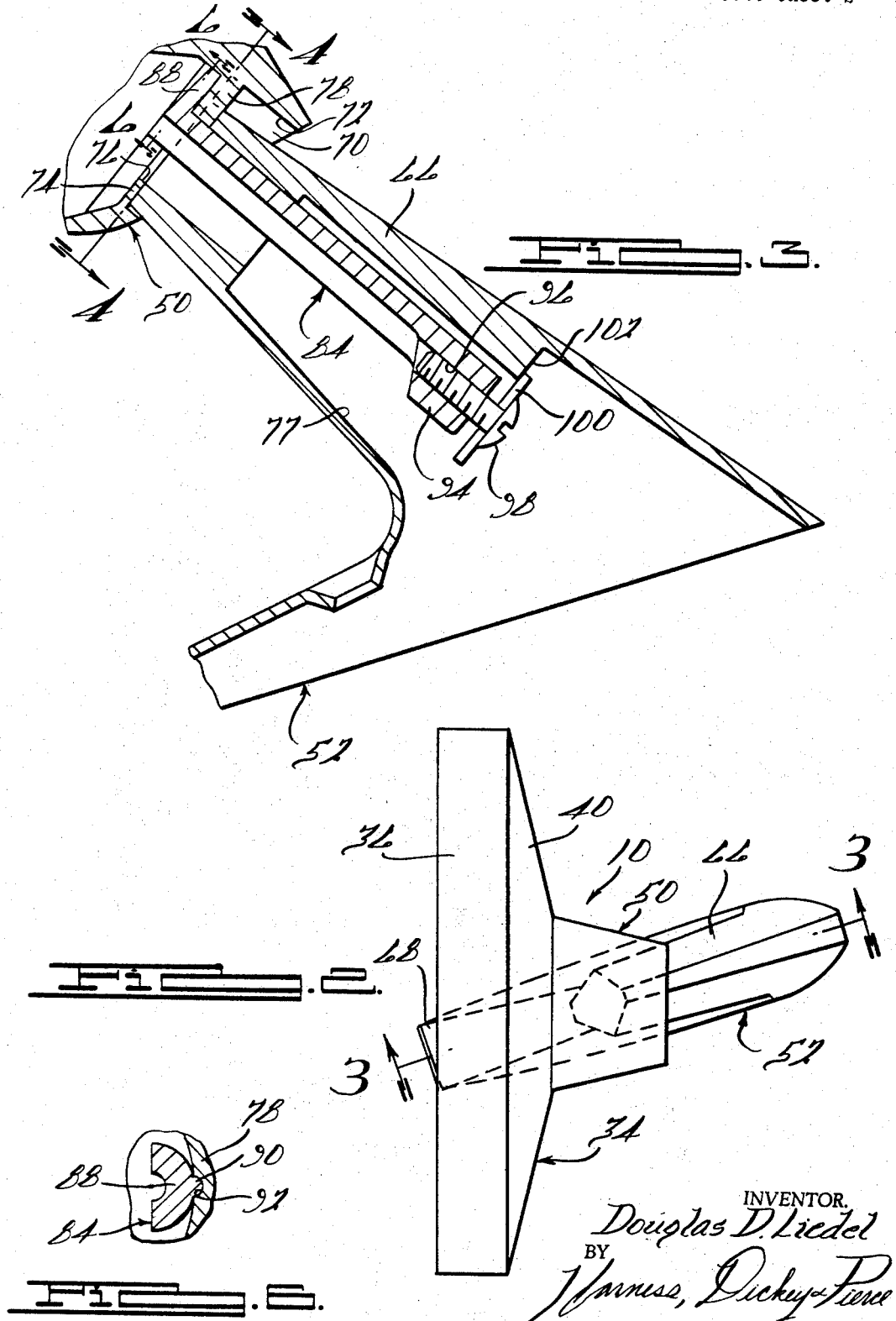
INVENTOR.
Douglas D. Liedel
BY
Harness, Dickey & Pierce
ATTORNEYS United States Patent Office 3,407,683
Patented Oct. 29, 1968

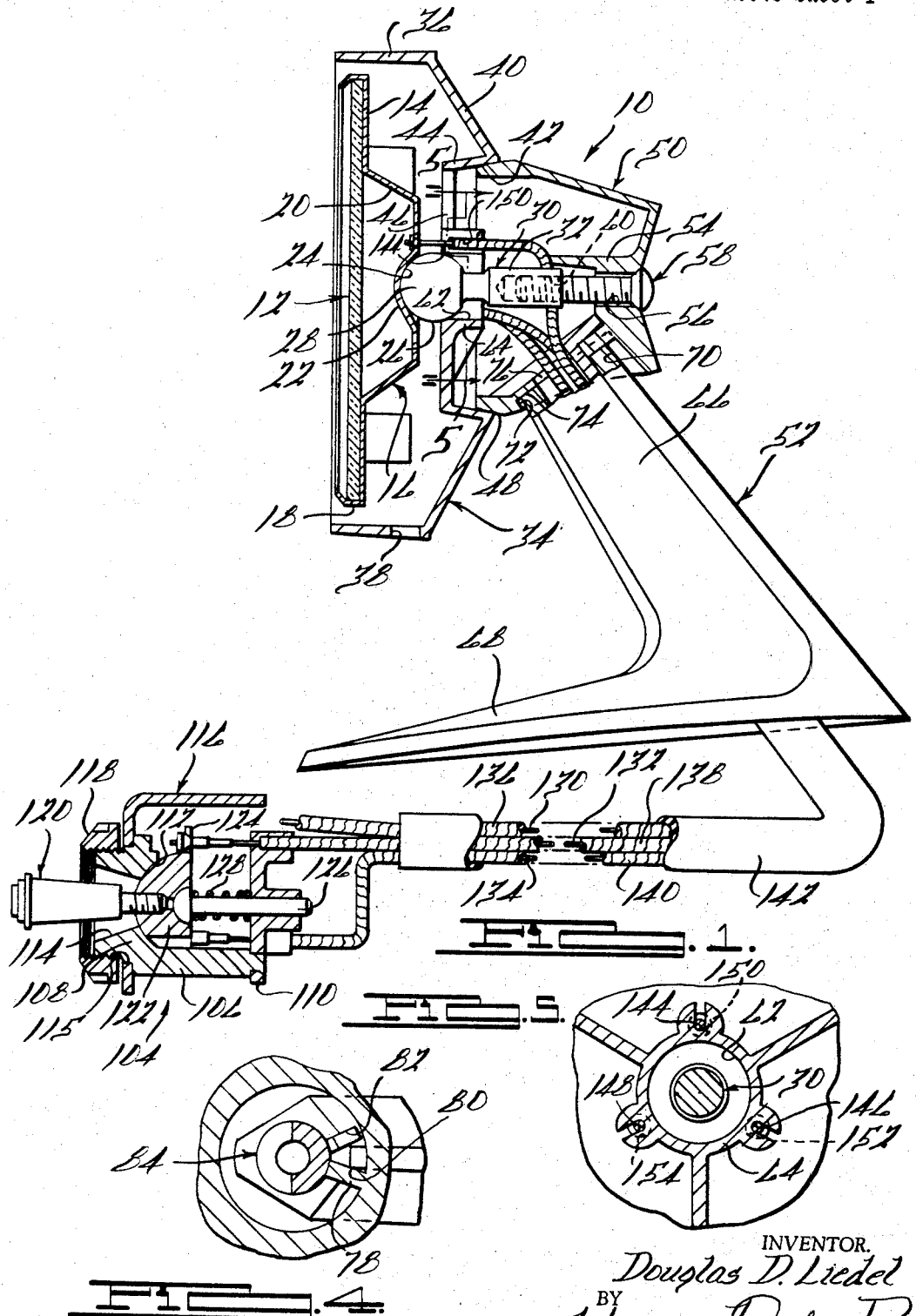

3,407,683
UNIVERSAL MIRROR
Douglas D. Liedel, Belleville, Mich., assignor to C. M. Hall Lamp Company, Detroit, Mich., a corporation of Michigan
Filed June 10, 1966, Ser. No. 557,346
37 Claims. (Cl. 74—501)

ABSTRACT OF THE DISCLOSURE

An outside rear view mirror for a vehicle with high mirror position flexibility and adjustable for remote control. A hood element is supported for rotation upon relatively stationary elements by two sets of mating and cooperating surfaces. Thus the hood element has a socket portion which cooperates with a portion of a ball end portion of a mounting stud member, and in addition the outer surface of the stationary element is engaged by a concave seat or recess in the hood element. During hood adjustment, the mirror element maintains its position relative to the hood, because cable casings are hood-supported and the mirror element is remotely adjustable relative to the hood.

---

This invention relates generally to mirrors and, more particularly, to a new and improved rear view mirror of the type suitable for mounting on the exterior of an automotive vehicle.

It is a general object of the present invention to provide a new and improved rear view mirror of the above character wherein the mirror element thereof is universally adjustable with respect to the mirror body for both visual and styling purposes.

It is a more particular object of the present invention to provide a universal mirror of the above character wherein the mirror element thereof is universally adjustable so that it may be positioned in substantially planar relation with respect to the face opening of the mirror body when said body is operatively mounted at any of the conventional locations on an automotive vehicle, i.e., front fender, door, etc.

It is another object of the present invention to provide a new and improved universal mirror of the above character which is adapted to be mounted on either side of an automotive vehicle.

It is still another object of the present invention to provide a universal mirror of the above character wherein the mirror element thereof may be adjusted directly by hand or alternatively by means of a remote control mechanism located within the interior of the vehicle.

It is a further object of the present invention to provide a universal mirror of the above character which is of a durable construction, is pleasant in appearance, and may be easily mounted on an automotive vehicle.

It is yet a further object of the present invention to provide a universal mirror as above described which is of a relatively simple design, is easy to assemble, and economical to commercially manufacture.

Other objects and advantages of the present invention will become apparent from the following detailed description, taken in conjunction with the accompanying drawings, wherein:

FIGURE 1 is a side elevational view, partially broken away, of an exemplary embodiment of the universal mirror of the present invention, as shown in operative association with a remote control mechanism;

FIGURE 2 is a top elevational view of the universal mirror illustrated in FIGURE 1;

FIGURE 3 is an enlarged fragmentary cross-sectional view of a portion of the universal mirror illustrated in FIGURE 2, as taken substantially along the line 3—3 thereof;

FIGURE 4 is a transverse cross-sectional view taken substantially along the line 4—4 of FIGURE 3, FIGURE 5 is a transverse cross-sectional view of a portion of the universal mirror illustrated in FIGURE 1, as taken substantially along the line 5—5 thereof, and FIGURE 6 is a fragmentary cross-sectional view taken along the line 6—6 of FIGURE 3.

Although the illustrated exemplary embodiment of the universal mirror of the present invention is shown herein in operative association with a remote control mechanism which enables an automotive vehicle operator to adjust the angular position of the mirror element from within the interior of the vehicle, it will be noted that the principles of the present invention are not limited to such a combination and that the universal mirror of the present invention is readily adapted to be mounted on the exterior of an automotive vehicle with the mirror element thereof being adjustable by the operator exerting an adjusting force directly to the mirror element with his hand.

For convenience of description, the terms "upper," "lower," "front," "rear" and words of similar import will have reference to the universal mirror of the present invention and parts thereof as appearing in FIGURE 1, the frontward or forward side of the mirror being at the right side of this figure. The terms "inner," "outer," and derivatives thereof will have reference to the geometric center of said mirror and the various parts thereof.

Referring now to the drawings, a universal mirror 10, in accordance with an exemplary embodiment of the present invention, is shown as comprising a mirror element 12 which is reflective, or the front or rear surface of which is coated with a reflective material, and which is glued or otherwise fixedly secured to a generally flat or planar support portion 14 of a relatively movable mirror element support member 16. Together with the support portion 14, the member 16 comprises a rim portion 18 that is crimped or similarly formed radially inwardly adjacent the outer peripheral edge of the mirror element 12. The support member 16 further comprises an integral rearwardly extending, cup-shaped section 20 that is formed with a hemispherical recessed portion 22. The portion 22 defines a hemispherical surface 24 which serves as the socket element of a ball and socket joint, as will hereinafter be described.

The surface 24 engages and cooperates with a conforming, spherical surface 26 defined by the ball end portion 28 of a mounting stud member 30, which member 30 also comprises an elongated forwardly projecting section 32 that is formed integral with the ball portion 28. It may be noted that while both of the surfaces 24 and 26 are shown as being spherical, if it is desired to provide less than universal tilting movement of the support member 16, and hence the mirror element 12, with respect to the stud member 30, these surfaces may be formed to permit only a preselected limited tilting motion. In the exemplary embodiment described herein, the support member 16 is retained in pivotal engagement with the stud member 30 by means of a plurality of actuating cables communicable with a remote control mechanism later to be described in detail; however, it will be noted that the present invention is not intended to be limited to such means for retaining the support member 16 in engagement with the stud 30 since various alternative arrangements may be used without departing from the scope of the present invention.

The mirror element 12 and support member 16 are mounted within a generally rearwardly opening concave body member 34 having a rearwardly extending hood or cover portion 36 that is somewhat larger than and surrounds the mirror element 12, the bottom of which portion 36 is preferably formed with a suitable opening 38 to permit moisture which may accumulate within the member 34 to drain therefrom. The forward end of the cover portion 36 terminates at an inwardly and forwardly inclined portion 40 which in turn terminates at its innermost edge at a circular forwardly concave recess 42 defined by rearwardly and inwardly extending wall portions 44 and 46, respectively. In the illustrated and preferred construction of the body member 34, the portions 36, 40, 44 and 46 are integrally formed and may be a single die casting.

The rearwardly extending portion 44 of the body member 34 is tapered slightly inwardly and rearwardly and is adapted to contiguously engage a complementary tapered surface 48 defined at the rearward end of a cap member 50 that is partially received within the recess 42. The cap member 50, which may be and preferably is secured to the upper end of a pedestal or base member 52 in a manner later to be described, serves as a relatively stationary member.

As illustrated in FIGURE 1, the cap member 50 is generally cup-shaped and is formed with a rearwardly projecting centrally disposed boss portion 54 centrally apertured, as seen at 56, to freely accept a retaining screw, bolt or the like 58. The rearward end of the screw 58 is threadably received in a forwardly extending, internally threaded bore 60 formed in the section 32 of the stud member 30, whereby the member 30 extends rearwardly from and is secured to the cap member 50. The stud section 32 is preferably noncircular (square) in transverse cross-section to facilitate engagement thereof by a suitable tool when tightening or loosening the screw 58 relative thereto.

As best illustrated in FIGURE 1, the stud member 30 extends rearwardly through a central opening 62 defined by a forwardly projecting boss portion 64 formed on the wall portion 46 of the body member 34, the ball portion 28 being disposed on the rearward side of the portion 46. Due to the fact that the ball portion 28 is of a somewhat larger diameter than the opening 62, upon tightening the screw 58 relative to the stud member 30, the latter is drawn forwardly with respect to the cap member 50, whereby the ball portion 28 firmly peripherally engages the rearward end of the opening 62, as seen at 64 in FIGURE 1, with the result that the body member 34 is urged forwardly with respect to the cap member 50 and is thus fixedly secured thereto. In the event it is desired to angularly position the body member 34 with respect to the cap member 50, it is merely necessary to loosen the screw 58 slightly to permit the desired adjustment. In a preferred construction of the present invention, the body member 34 is movable about 10° in any direction relative to the central axis of the cap member 50; however, a greater or lesser amount of adjustable movement may be provided by varying the angle of the tapered wall 44 and surface 48 on the members 34 and 50, respectively.

As best seen in FIGURES 1 and 3, the base member 52 is formed with an upwardly and rearwardly inclined support section 66 which terminates at its lower end in a rearwardly projecting mounting section 68, the latter of which is adapted to be fixedly attached to an exterior portion of an automotive vehicle by means of suitable screws, bolts or the like, which extend through countersunk apertures in the section 68. The sections 66, 68 are preferably integrally formed and may be a single die casting.

In the illustrated embodiment of the universal mirror 10 of the present invention, the cap member 50, and hence the body member 34 secured thereto, is adapted to be fixedly secured to the upper end of the base portion 66 in either of two preselected angular positions with respect to the base member 52. The reason for this is to enable the mirror 10 to be mounted on either side of the associated automotive vehicle, or a pair of mirrors 10 to be mounted one on each side of the vehicle, in a manner such that the body and cap members 34, 50 of each of the mirrors 10 are symmetrically oriented with respect to their associated base members 52, with the result that the styling symmetry of the vehicle is not adversely affected when it is desired to mount the mirror 10 on either or both sides thereof, and with the further result that the same mirror construction may be universally mounted at either side of a vehicle with only a single minor adjustment of the cap member 50 with respect to the base member 52. The two preselected positions are determined by the orientation of a tab-like boss portion on the lower side of the cap member 50 relative to two complementary shaped recesses formed on the upper end of the base portion 66. It will be noted that in the event it is desired to provide for universal adjustable movement between the members 50 and 52, the tab and recesses may be eliminated.

Referring now in detail to FIGURES 1, 3 and 4, it will be seen that the lower side of the cap member 50 is formed with a circular recess 70 defined by an annular side wall 72 and an inclined upper wall 74. The recess 70 is adapted to nestingly receive the upper end of the base portion 66 therewithin, the wall 74 being formed with a central opening 76 which is communicable with the interior of the cap member 50 and a central cavity 77 defined by the base portion 66. As seen in FIGURE 3, the wall 74 is formed with a downwardly extending tab-like boss portion 78, which, upon assembly of the cap member 50 onto the base member 52, is adapted to be received in either of two angularly oriented notches or recesses 80 or 82 (see FIGURE 4) formed on the top of the base portion 66. The respective positions of the recesses 80, 82 are determined in accordance with the particular vehicle on which the mirror (or pair of mirrors) 10 is mounted, that is, one of the recesses 80 or 82 is located so that when the tab 78 is disposed therein, the face opening of the body member 34 is in substantial visual alignment with the vehicle operator when the mirror 10 is mounted on one side of the vehicle, and the other of said recesses 80, 82 is located so that when the tab 78 is disposed therein, the face opening of the member 34 is substantially visually aligned with the vehicle operator when the mirror 10 is mounted on the opposite side of the vehicle. As hereinabove mentioned, the tab portion 78 and recesses 80, 82 may be omitted if it is desired to provide for unlimited adjustable movement of the cap member 50 relative to the base member 52.

As best seen in FIGURE 3, the cap member 50 is secured to the top of the base portion 66 by means of an elongated locating pin 84 which extends longitudinally within the cavity 77. The major length of the pin 84 is semicircular in transverse cross-section (see FIGURE 4), the upper end thereof extending through the opening 76 in the cap member 50 and being formed with a semicircular, outwardly extending flange portion 88 which is adapted to engage the upper surface of the wall 74, as seen in FIGURE 3. The flange portion 88 is formed with a locating dimple or boss 90 which is adapted to be received within a complementary shaped recess 92 formed in the cap member 50. The lower end of the locating pin 84 is formed with an enlarged section 94 defining a central threaded bore 96. The pin 84 is normally forced downwardly and forwardly, thereby maintaining the cap member 50 on the top of the base member 52, by means of a suitable screw, bolt or the like 98 that is threadably received in the bore 96 and is provided with an outwardly extending washer 100 that abuts against a downwardly inclined shoulder 102 in the cavity 77. At such time as it is desired to adjust the cap member 50 with respect to the base member 52, it is merely necessary to loosen the screw 98 sufficiently to permit the tab portion 78 to be moved from one of the recesses 80, 82 to the other of said recesses.

The universal mirror 10 of the present invention is shown in operative association with a remote control mechanism 104 (see FIGURE 1) which enables the mirror element 12 to be angularly positioned with respect to the body member 34 from the interior of the associated vehicle. By way of example, the remote control mechanism 104 is of the type described and claimed in United States Patent No. 2,931,245, issued Apr. 5, 1960, which mechanism 104 per se does not constitute a material part of the present invention and therefore will not be described in detail. It will be noted that the provision of the remote control mechanism 104 is not considered essential to advantageous use of the various features of the universal mirror 10 of the present invention, and that a description of said mechanism 104 is incorporated herein merely to show an exemplary application of the present invention.

The control mechanism 104 comprises a control base member 106 having a front portion 108 and a rear member 110 secured thereto. The portion 108 defines a hemispherical recess 112 and a conically shaped central opening 114. The portion 108 extends through an opening 115 in a mounting bracket 116 and a suitable gland nut or the like 118 is adapted to be threaded on the portion 108 to fixedly secure the mechanism 104 to the bracket 116 and hence to the instrument panel, for example, of the associated automotive vehicle.

The control element of the mechanism 104 comprises a pivot member 120 which extends through the opening 114 and is rigidly secured to a hemispherical member 122 that is contiguously engaged with the hemispherical surface 112 defined by the member 106. The member 122 is provided with three outwardly extending and equally circumferentially spaced ears 124 and is adapted to be resiliently urged into engagement with the surface 112 by means of a pressure pin 126 and helical coil spring 128 which extends coaxially around the pin 126 interjacent the members 122 and 110.

Three control cables, 130, 132 and 134, which may be fabricated of woven metallic wire or the like, each have one end fixedly secured to one of the ears 124, as by soldering or the like. The cables 130, 132 and 134 are respectively provided with suitable cable casings or sheathings 136, 138 and 140 which are secured against axial movement relative to the mechanism 104 by being nested within suitable recesses formed in the member 110. The cables 130, 132 and 134, together with their respective casings, extend through a main casing 142 from the remote control mechanism 104 to the universal mirror 10, as illustrated in FIGURE 1. The cables 130, 132 and 134 extend through the cavity 77 and the opening 76 in the cap member 50, the ends of the cables extending through openings 144, 146 and 148 formed in the body member 34 circumjacent the opening 62 thereof, as best seen in FIGURE 5. The ends of the cables 130, 132 and 134 are fixedly secured to the cup-shaped section of the support member 16 at positions equally circumferentially spaced around the hemispherical recess portion 22. The ends of the cable casings 136, 138 and 140 also extend into the interior of the cap member 50 and are rigidly secured against axial movement relative to the body member 34 by being fixedly secured within slots 150, 152 and 154 formed circumjacent the openings 144, 146 and 148, respectively. The control cables 130, 132 and 134 are selected to be of a length so as to be maintained in a state of tension between the mechanism 104 and mirror 10. This provides the desired force to maintain the support member 16 in peripheral engagement with the ball portion 28 of the stud member 30.

It will be seen from FIGURE 1 that in the particular embodiment of the present invention illustrated herein, the radial distance from the control ends of the cables 130, 132 and 134 to the center of pivoting of the control member 122 is greater than the corresponding distance from the mirror ends of the cables 130, 132 and 134 to the center of pivoting of the support member 16 around the ball portion 28 of the stud member 30. Thus, it will be evident that a given angular movement of the pivot member 120 will produce a somewhat larger angular movement of the mirror element 12 relative to the stud member 30. Accordingly, when it is desired to angularly adjust the mirror element 12, it is only necessary to move the pivot member 120 a small amount.

It will be seen from the above description of the universal mirror 10 of the present invention that when the body member 34 is angularly adjusted with respect to the cap member 50, the mirror element 12 will remain in substantial planar relation with respect to the face opening of the body member 34. This, of course, is of substantial importance for appearance and styling purposes since the mirror element 12 is continuously oriented within the plane of the face opening of the member 34, regardless of the position (within predetermined limits) to which the body member 34 may be adjusted relative to the cap member 50. Thus, when the mirror 10 is operatively mounted on an automotive vehicle (on either side thereof), a major adjustment can be made of the body member 34 relative to the cap member 50, with the result that the mirror element 12 remains in substantial planar relation with respect to the opening of the member 34. Thereafter, a minor adjustment can be made, as by hand or by the remote control mechanism 104, of the mirror element 12 with respect to the body member 34 to suit the particular demands and desires of the vehicle operator.

While it will be apparent that the exemplary embodiment illustrated herein is well calculated to fulfill the objects above stated, it will be appreciated that universal mirror 10 of the present invention is susceptible to modification, variation and change without departing from the proper scope or fair meaning of the subjoined claims.

What is claimed is:

1. In a rear view mirror mountable on the exterior of a vehicle, a mirror element, a relatively stationary member, a relatively movable hood member defining a face opening, means for supporting said movable hood member on said stationary member for adjusting movement in rotation about a generally horizontal axis generally parallel with the longitudinal axis of the vehicle to any angular position within a range, and means for movably supporting said mirror element adjacent the face opening of said movable member for movement with said hood member during said adjusting movement of said hood member for substantially maintaining the relationship between said mirror element and said hood member throughout said adjusting movement of said hood member.

2. The combination of claim 1 in which said hood member is wider than it is tall and in which said adjusting movement permits said hood member to be positioned in selected orientation with respect to the ground.

3. The combination of claim 2 further including means for securing said hood member in the adjusted selected position.

4. The combination of claim 2 in which said hood member is also adjustably movable about additional axes relative to said stationary member.

5. The combination of claim 4 further including means for remotely adjusting said mirror element with respect to said movable hood member, adjusting movement of said movable hood member providing a major adjustment of the relationship between the surface of said mirror element and the vehicle, and said means for remotely adjusting said mirror element providing further fine adjustment of the relationship between the surface of said mirror element and the vehicle.

6. The combination of claim 5 wherein said remote control means comprises cable means connected to said mirror element, casing means surrounding said cable means, said casing means being axially immovably engaged with said movable member, whereby movement of said cable means relative to said movable member will affect movement of said mirror element, but movement of said movable member within predetermined limits with respect to said stationary member will not affect any relative movement between said mirror element and said movable member.

7. The combination of claim 1 in which said adjusting movement includes universal pivotal and rotational movement to any angular position in any sense within a small range of angular positions to permit adjustment of said hood member in relation to the vehicle.

8. The combination of claim 7 further including means for remotely adjusting said mirror element with respect to said movable hood member, adjusting movement of said movable hood member providing a major adjustment of the relationship between the surface of said mirror element and the vehicle, and said means for remotely adjusting said mirror element providing further fine adjustment of the relationship between the surface of said mirror element and the vehicle.

9. The combination of claim 1 wherein said means for movably supporting said mirror element comprises ball and socket elements.

10. The combination of claim 9 in which said means for supporting said movable hood member for adjustment movement includes ball and socket elements.

11. The combination of claim 10 in which said ball element for movably supporting said mirror element includes a spherical surface facing in one direction and in which said ball element for movably supporting said hood member includes a spherical surface facing in a direction opposite to said one direction.

12. The combination of claim 11 in which said spherical surfaces are fixed with respect to each other.

13. The combination of claim 12 in which said spherical surfaces are portions of a single spherical ball.

14. The combination of claim 11 in which said socket element for movably supporting said mirror element is secured to said mirror element, in which said ball element for movably supporting said mirror element includes a spherical surface facing said mirror element and engaging said socket, in which said socket element for movably supporting said hood member is fixed to said hood member, and in which said ball element for movably supporting said hood member includes a spherical surface engaging said socket fixed to said hood member.

15. The combination of claim 14 in which said spherical surfaces face in opposite directions.

16. The combination of claim 15 in which said spherical surfaces are concentric.

17. The combination of claim 1 in which said means for supporting said movable hood member for adjusting movement includes ball and socket elements.

18. The combination of claim 17 in which said ball and socket elements further serve as an element of a means for securing said hood member in the selected adjusted position.

19. The combination of claim 18 in which said socket element is integral with said hood member, in which said ball element is securable to said relatively stationary member, and in which the securing of said ball element to said relatively stationary member clamps said movable hood member against said relatively stationary member.

20. The combination of claim 1 further including a base member securable to the vehicle and carrying said relatively stationary member.

21. The combination of claim 20 in which said relatively stationary member is adjustably positionable relative to said base member.

22. The combination of claim 21 in which said base member has an upwardly extending axis and in which said relatively stationary member is selectively rotatable about said axis.

23. The combination of claim 22 in which said axis is tilted relative to the vertical.

24. In a rear view mirror mountable on the exterior of a vehicle, a mirror element, a relatively stationary member, a relatively movable hood member defining a face opening, means for supporting said movable hood member on said stationary member for adjusting movement to any selected position within a range, and means for movably supporting said mirror element adjacent the face opening of said movable member for movement with said hood member during said adjusting movement of said hood member for substantially maintaining the relationship between said mirror element and said hood member throughout said adjusting movement of said hood member, said means for supporting said movable hood member comprising first mating cooperating and engaging elements on said stationary member and said movable hood member respectively and moving relative to one another during said adjusting movement, and second mating cooperating and engaging elements on said stationary member and said movable hood member respectively and spaced from said first elements and moving relative to one another during said adjusting movement.

25. The combination of claim 24 in which said first mating and cooperating elements are movable relative to one another in rotation and in which said second mating and cooperating elements are movable relative to one another in rotation.

26. The combination of claim 24 in which said first mating and cooperating elements are movable relative to one another in rotation about a generally horizontal axis and in which said second mating and cooperating elements are movable relative to one another in rotation about a generally horizontal axis.

27. The combination of claim 26 in which the axis about which said first elements are rotatable relative to one another is the same as the axis about which said second mating and cooperating elements are rotatable relative to one another.

28. The combination of claim 25 in which the elements of at least one of said sets of mating and cooperating elements are also adjustably movable relative to one another about additional axes.

29. The combination of claim 25 in which the elements of both sets of mating and cooperating elements are also adjustably movable relative to one another about additional axes.

30. The combination of claim 25 in which said mating and cooperating elements comprise ball and socket elements.

31. The combination of claim 30 in which said second mating and cooperating elements comprise an outwardly facing surface on said stationary member and a concave surface on said movable hood member.

32. The combination of claim 31 further including securing means for selectively locking both of said sets of mating and cooperating elements against movement relative to one another.

33. The combination of claim 24 in which said means for movably supporting said mirror element comprises a ball and socket joint.

34. The combination of claim 33 in which said first mating and cooperating elements comprise a ball and socket joint.

35. The combination of claim 24 in which said first mating and cooperating elements comprise a ball and socket joint with the portion of the ball thereof which is engageable with the socket facing in one direction which is generally parallel with the longitudinal axis of the vehicle, and in which said means for movably supporting said mirror element comprises a ball and socket joint with the portion of the ball thereof which is engageable with the socket facing in a direction opposite to said one direction.

36. The combination of claim 35 in which said ball portions are both secured to said stationary member.

37. The combination of claim 36 in which said ball portions are portions of a common spherical surface.

(References on following page)

References Cited

UNITED STATES PATENTS

| | | | |
|---|---|---|---|
| 2,533,475 | 12/1950 | Koonter | 248—484 X |
| 2,931,245 | 4/1960 | Jacobson | 74—501 |
| 3,024,049 | 3/1962 | Tranas | 248—482 |
| 3,096,664 | 7/1963 | Walsh | 74—501 |
| 3,198,071 | 8/1965 | Gosling | 350—288 |
| 3,235,294 | 2/1966 | Naylor et al. | 248—481 |
| 3,348,425 | 10/1967 | Van Noord | 74—501 |
| 3,370,479 | 2/1968 | Van Noord | 74—501 |

FRED C. MATTERN, Jr., *Primary Examiner.*

C. F. GREEN, *Assistant Examiner.*